Figure 1:
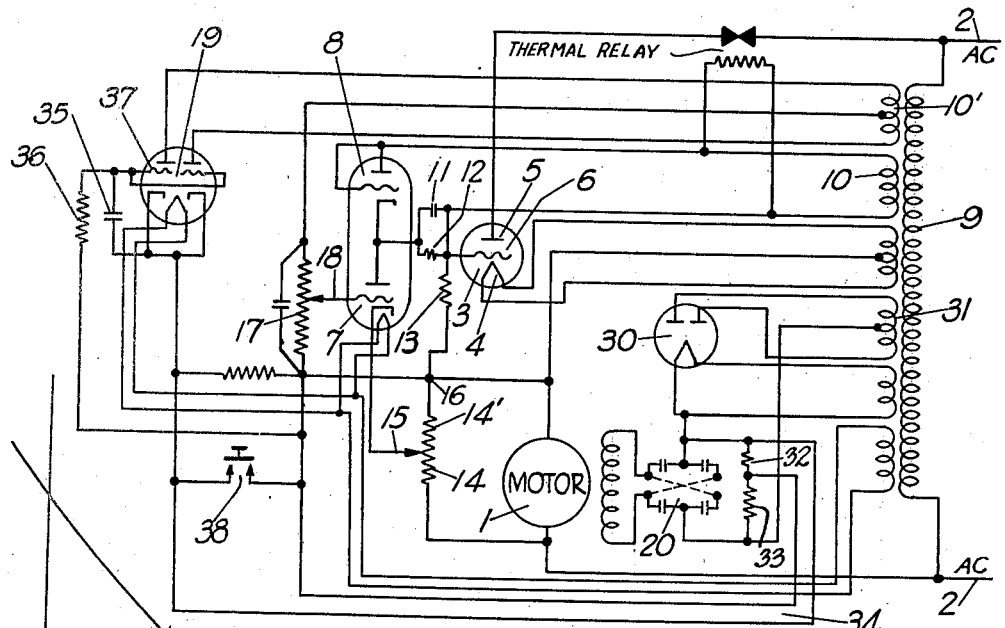

July 4, 1944.  W. C. GRABAU  2,352,626
MOTOR SPEED REGULATOR
Filed March 2, 1942  2 Sheets-Sheet 1

INVENTOR
WILLIAM C. GRABAU
BY
ATTORNEY

July 4, 1944. W. C. GRABAU 2,352,626
MOTOR SPEED REGULATOR
Filed March 2, 1942 2 Sheets-Sheet 2

INVENTOR
WILLIAM C. GRABAU
BY
ATTORNEY

Patented July 4, 1944

2,352,626

UNITED STATES PATENT OFFICE 2,352,626

MOTOR SPEED REGULATOR

William Christian Grabau, Brighton, Mass., assignor to Submarine Signal Company, Boston, Mass., a corporation of Maine Application March 2, 1942, Serial No. 432,982

15 Claims. (Cl. 172—239)

The present invention relates to control of electrical apparatus and more particularly to the operation of a motor by means of an alternating current source and to means and method for holding constant or varying at will the speed of the motor under constant and varying load conditions. In particular, the apparatus of the present invention uses in combination thermionic control tubes of the vacuum tube type operating in conjunction with gaseous control tubes.

In the prior art various means and methods have been used to operate direct current motors from an alternating current source through gaseous rectifier tubes using a control grid and these methods principally involve the use of alternating current upon the grid of the rectifier tube with means for varying the phase of the grid voltage with respect to that applied to the anode of the gaseous tube. While such systems have worked out fairly well, control, particularly at low speeds or with intermittent and greatly varying loads, is not wholly reliable, and, further, it is at times difficult for the reaction to be responsive quickly to the desired control as effected by the change impressed which might be manual or automatically operated. This difficulty is partly due to the fact that the change in phase of the alternating current source as applied to the grid does not produce a simple variation in position of the cut-off for the gaseous control tube but varies in accordance with the alternating current shape of the curve.

In accordance with the present invention the point of cut-off of the gaseous control or rectifier tube is definitely established by a family of grid bias curves which are substantially parallel to each other over a broad range and intersect the critical grid voltage curve of the control tube in a substantially normal direction so that the point of firing of the rectifier or control tube is definitely and accurately established. This control is accomplished through the use of a discharge circuit operating through vacuum tubes and circuits in such a manner that under all conditions the voltage on the grid of the gaseous rectifier tube during any operating cycle drops from a substantial voltage to the operating voltage of the rectifier tube. The control is effected not through a variation in phase but through a variation in the reactance of the thermionic vacuum control tube by variation of the grid bias on that tube in conjunction with a condenser discharge circuit. In this relation the cut-off characteristics of anode-cathode current of the thermionic vacuum tubes play an important part.

Figure 3:
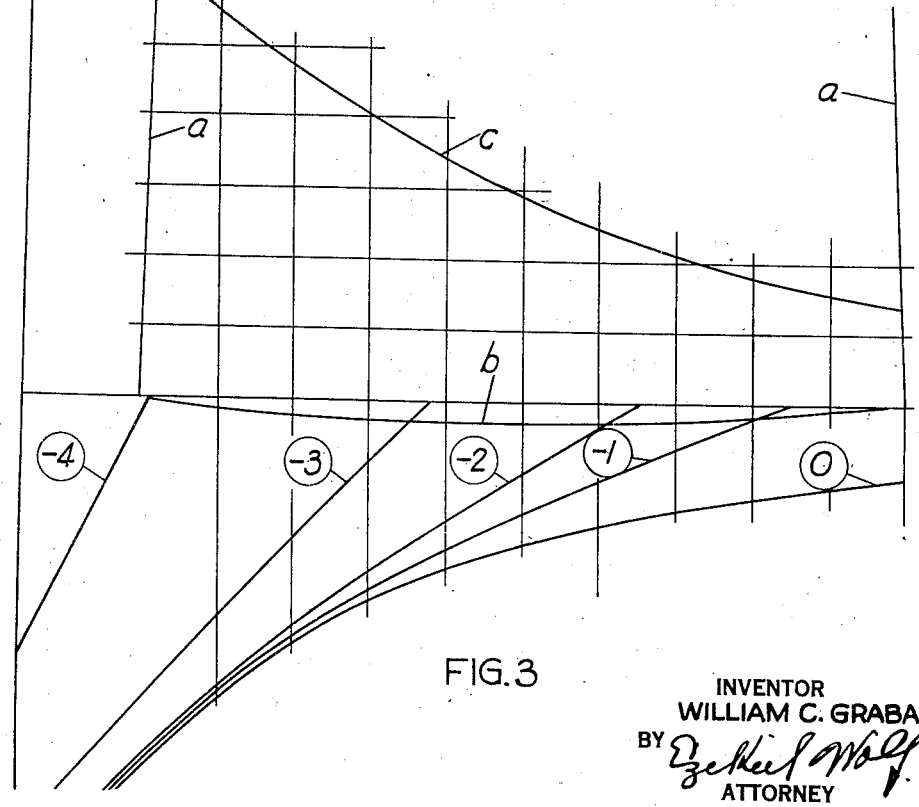
Figure 2:
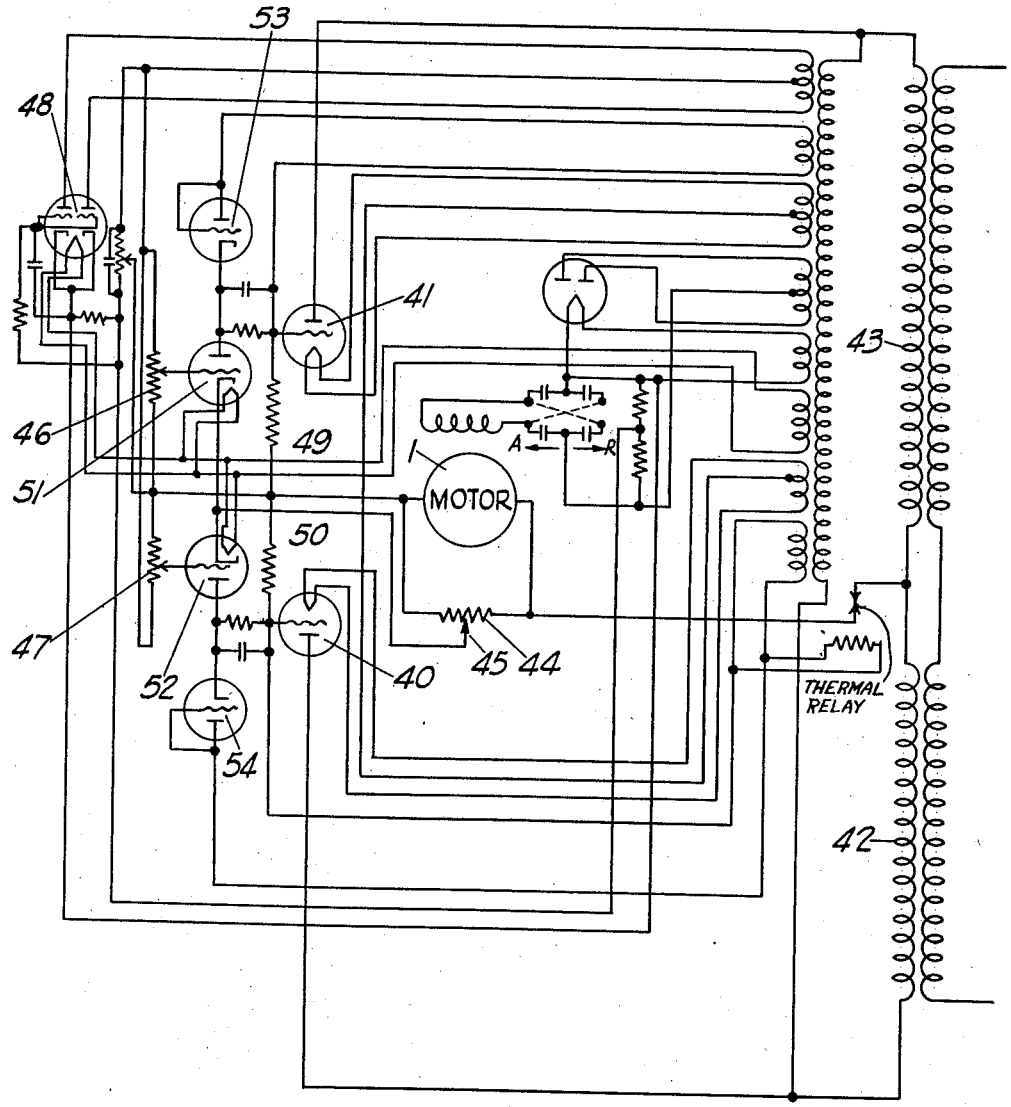

Without further describing the merits and advantages of the present invention, the invention will be described in connection with the drawings illustrating an embodiment of the invention in which Fig. 1 shows a diagram of the invention using one-half wave circuit; Fig. 2 shows a diagram using a full-wave circuit; and Fig. 3 shows a group of curves illustrating the operation of the system.

In Fig. 1, 1 is a direct-current motor which is operated from the power of the alternating current source 2 through the gaseous control and rectifier tube 3. The rectifier tube 3, which may be of the so-called thyratron type, is provided with a cathode 4, an anode 5 and a control grid 6. This tube may be of the type in which a magnitude of 3 volts negative bias applied to the grid 6 will hold off a discharge of the tube for 440 alternating current volts applied between the cathode and anode of the tube.

The bias on the grid 6 of the gaseous tube 3 is controlled through a thermionic control tube circuit. This includes a twin triode tube, one triode section of which is used as a triode control 7 having a cathode, anode and grid electrodes and a second triode section 8 in which the grid and plate are connected together forming thereby a simple thermionic rectifier valve. A transformer 9 is provided connected across the alternating current line for supplying power to various control elements in the circuit. In the circuit, including the tube 8, is a secondary 10 which supplies alternating current across the valve 8 usually at about 110 volts when the main alternating current circuit has a voltage of 440. The secondary 10 of the transformer 9 is applied in series across the tube 8 and the condenser 11 which is shunted by a resistor 12. The resistor 12 and the condenser 11 are also in the anode-cathode circuit of the tube 7. There is also in this anode-cathode circuit a resistor 13 and a portion of a shunt motor resistance 14 which has an adjustable tap 15 connected to the cathode of the tube 7. The point 16 between the resistors 13 and 14 is connected to the positive side of the grid biasing resistance 17 to which the grid of the tube 7 is connected through an adjustable tap 18 and provides a negative bias component for the grid of the tube 7. Direct current is supplied to the resistance 17 by means of the full-wave rectifier 19 energized through the secondary 10' from transformer 9 of the alternating current supply source. The drop across the resistance 17 is therefore as constant as the alternating current source. The variation in position of the adjustable tap 18 supplies the control for varying the speed of the motor. This control in combination with the control of the adjustable tap 15 supplies a complete control for speed and torque in the operation of the motor. In addition to this a reversing switch 20 may be used in the circuit for reversing the direction of the field supply and thereby the direction of rotation of the motor. The motor field is fed by rectified alternating current through the rectifier tube 30 and the secondary 31 of the transformer 9.

The condenser-charging circuit which includes the secondary 19, the tube 3 and the condenser 11 is charged to a peak voltage value during approximately the first positive quarter of the alternating current cycle. During the remaining portion of the cycle comprising the last positive quarter and the negative half cycle, the voltage across the resistor 12 declines in a general exponential curve to a value somewhat above zero. During the complete cycle, therefore, a positive voltage is applied to the anode of the tube 7 with respect to the cathode through the resistance 13 and that portion of the resistance 14 from the point 16 to the adjustable tap 15. The resistances 12 and 13 are preferably given equal values which may be of the order of 100,000 ohms while the resistance of the portion 14' of the resistor 14 up to the adjustable tap may be somewhat less. It will be noted that the resistance 14 is connected across the motor armature terminals so that the voltage through the resistor 14 at times other than when the tube 3 conducts current is equal to the E. M. F. generated by the motor. At times, however, when the tube 3 is conducting, the voltage across the resistance 14 is substantially that of the line voltage. Due to the fact that when current is flowing in the tube 3, the grid 6 loses control, it is immaterial what voltage exists across the resistance 14 at such times since in no event can the grid 6 of the tube 3 gain control until conduction across the tube has been extinguished by the negative half of the alternating current cycle. In view of this situation the point of chief interest with reference to the voltage across the resistor 14 is that which exists before the tube 3 permits conduction of current. During the time up to the point when the resistance in the tube 3 breaks down, the potential generated across the resistance 14 is practically in proportion to the motor speed assuming a constant shunt field applied. Further, the adjustable tap 15 is set to a point so that a positive bias is placed on the grid of the tube 7 proportional to a fractional part of the back E. M. F. of the motor. This positive bias is offset by the negative bias in the resistor 17 and the adjustment of these two potentials control the characteristics of speed and torque in the operation of the system. As the speed of the motor increases due to lightening of the load, for instance, the positive bias will increase in the portion 14' of the resistor 14, thus reducing the negative bias and causing the thermionic control tube 7 to permit an earlier passage of current in the alternating current cycle as applied across the resistor 12 and also a passage of more current during the entire cycle. This tends, of course, to establish a more negative bias on the resistance 13 as applied to the grid 6 of the gaseous control tube 3 and therefore holds off for a longer period the firing of the tube 3, thus reducing the energy applied to the motor 1 and thereby reducing its speed.

If, however, it is desired to operate the motor with a higher torque for the same speed, the positive bias adjustment 15 on the resistor 14 will be increased and the negative bias adjustment 18 also increased to re-establish the desired grid bias difference corresponding to the chosen motor speed. This increase of the positive bias will operate to produce a greater correction factor with a smaller change in motor speed; that is, if the motor speed, for instance, is decreased 10%, the positive bias would also be decreased 10%, but if the positive bias were set at a higher value than previously, then the actual voltage decrease would be greater than in the initial instance. The grid of the gaseous control tube will therefore respond more quickly to bring the speed back to the desired normal condition. The result is that for the same motor speed with increased load, a larger decrease of the positive bias will occur, thus permitting a higher negative bias on the vacuum control tube 7 and an earlier shut-off of current in the anode-cathode tube of the circuit 7 and therefore an earlier collapse of the voltage across the resistor 13. The torque, therefore, may be raised, at the same time maintaining the same motor speed.

It is also possible to have a rising speed characteristic from no-load to full-load operation. In this case the gaseous control tube 3 will be operated with the tube not fully opened for a point corresponding to normal full load at normal speed. If under this condition the adjustment 15 on the resistor 14 is positioned so that the positive bias is considerably increased over normal and the negative bias 18 adjusted to produce the desired negative bias for full-load overspeed conditions, then the tube will have a tendency to fire earlier in the cycle depending upon the change in speed produced by the load when the motor was not receiving any power. In other words, if the load produces a tendency of slowing down the motor rapidly after the power is removed, the current will come on comparatively earlier and tend to maintain a higher speed than that under normal operation. In the present case, therefore, both constant speed and increasing speed curves may be obtained from no load to full load and greater than full-load torque.

The control of the motor speed is primarily obtained through positioning of the adjustable arm 18. An increase in the negative bias applied from the resistor 17 will make it necessary for the motor to speed up to balance the drop in that portion 14' of the resistance 14 in order to permit current flow in the cathode-anode circuit of the tube 7 and hold back the discharge of the tube 3. Until the negative bias provided by the resistor 17 is overcome by the increase in motor speed, the tube will fire early in the cycle and permit therefore full power to flow through the motor armature.

The djustment of th position of the arm 18 gives a very accurate control of the motor speed as will be more clearly seen from the arrangement in Fig. 3. In this figure the positive half of the alternating current cycle as applied to the control tube 3 is shown in fragments by the curve $a$. Since this voltage runs up to a peak of about 616 volts for an alternating current voltage of 440 volts, the curve extends well up beyond the boundaries of the figure. The critical grid voltage curve is indicated by the curve $b$, both curves $a$ and $b$ being applied to the gaseous control tube 3 in Fig. 1. The curve $c$ represents the voltage drop across the resistor 12 in the circuit of the tube 7, while the voltage curves 0, $-1$, $-2$, $-3$ and $-4$ represent the voltage drops across the resistor 13 with biases from cathode to grid in the tube 7 of respectively 0, −1, −2, −3 and −4 volts and voltage across resistor 12 as indicated by curve c. The curve c of Fig. 3 is also the decay of alternating potential across the tube 8 from a point in the alternating current cycle commencing at the peak of the positive half cycle and continuing through the rest of the cycle. The applied voltage across the tube 8 is applied in reverse or 180° out of phase with that of the line voltage in the transformer winding 9, so that the decay of voltage in this circuit of tube 8 will occur during the positive half cycle as applied to the gaseous rectifier tube 3. The grid bias curves 0, −1, −2, −3 and −4 enter the chart of Fig. 3 from the lower left and have inclined slopes intersecting the critical grid bias curve b substantially as indicated in the figure. These curves are illustrated with reference to thermionic tubes of the type 6SN7 in which approximately four volts bias corresponds to substantially complete cut-off in the tube 7 and zero volts bias corresponds to no cut-off in the tube 7. With one volt bias, for instance, on this tube, current may begin to flow in the cathode-anode circuit of tube 7 at approximately fifteen volts. Due to the fact, however, that directly after current begins to flow in the tube 7 the resistance 13 comprises the greater portion of the resistance in the anode-cathode circuit, the drop across the resistance 13 produces the greater portion of the voltage drop in the circuit. The result of this is that the curves of voltage drop across the resistor 13 rise steeply from the horizontal axes and intersect the critical grid voltage curve b in sharply defined intersections as illustrated in Fig. 3. Increasing the bias on the grid of the tube 7 from zero to −1 gives a wide gradation in the firing of the tube with extremely small changes in voltage so that for the slower speeds, very accurate regulation of the desired speed may be maintained. This permits accurate control of motor speeds practically down to zero R. P. M.

It will be noted in Fig. 1 that the portion 14' of the resistance 14 is also impressed across the plate circuit of the tube 7 and tends therefore to increase the voltage drop in the resistor 13 with increase in positive bias of the grid 7. This correction works in the same way as the normal bias correction on the grid 7 and brings about therefore an even more rapid correction of the speed and torque than would otherwise be obtained.

Another feature of the present system is the special means provided for even starting of the motor when the system is initially operated. Resistances 32 and 33 are connected in shunt across the rectified direct current source from the tube 30 and the potential across one of these resistances is applied by means of the line 34 to the condenser 35 which is shunted by the resistor 36. In starting, therefore, a negative bias is provided to the grid 37 of the rectifier tube 19 restraining the flow of current in the resistor 17 and thereby insuring current flow through the tube 7 and the resistor 13, thus preventing the discharge in the gaseous control tube 3. When the system is started, the potential across the line 34 is dropped to zero by means of the short-circuiting switch 38 which thereby permits the condenser 35 to discharge to zero, establishing current flow in the resistor 17 and permitting normal operation of the tube 7 and the circuit associated therewith, thus permitting the discharge across the gaseous control tube and application of current to the motor 1. As the charge on the condenser 35 leaks off gradually over a number of cycles, a number of cycles will elapse before full operation of the tube 3 occurs. This, therefore, will withhold a sudden rush of current into the motor armature and provide a normal desired starting condition.

Fig. 1 shows the operation of the system with the motor 1 operated by a half wave rectifier system. In Fig. 2 the motor 1 is operated through a full-wave rectifier comprising the two half wave elements 40 and 41. In the arrangement shown in Fig. 2 the transformer secondary 42 is across the anode circuit of the tube 40 while the transformer secondary 43 is across the anode circuit of the tube 41. The positive grid bias resistance shunted across the motor is indicated at 44 with the adjustable tap 45 connected to the common connecting point of the cathodes of the tubes 51 and 52. The resistors 46 and 47 are energized from a direct current source supplied by the rectifier 48. The circuits 49 and 50 with the vacuum control tubes 51 and 52, respectively correspond to the vacuum control tube 7 and its associated circuit in Fig. 1, while the constant potential supply for the tubes 51 and 52 are similarly effected as in Fig. 1 by means of the vacuum tubes 53 and 54, respectively. From this description it will be seen that the circuit of Fig. 2 operates in substantially the same manner as that of Fig. 1 with the exception that current is supplied in each half cycle alternately through separate rectifier circuits.

Primarily in the present system there is used a direct current potential of substantially constant value after initial operation has commenced, as, for instance, by means of the resistor 17. As shown in the circuit of Figs. 1 and 2 this is supplied through a rectifier source connected into the alternating current system. This may, of course, be operated by a separate direct current source either from battery or from other separate supply, and to an extent this potential might be adjustable, although it is preferable under ordinary normal operating conditions that this potential source remain constant. The other source of potential is that supplied by the motor which is to be regulated. This potential source may be supplied by direct connection across the motor terminals or through the medium of a current transformer or through some other generated potential proportional to the motor speed as, for instance, a separate generator or a generator operating a rectifier source.

The system, however, shown in Fig. 1, produces accurate control of speeds from low to full speeds with no-load and full-load torques under all conditions.

Having now described my invention, I claim:

1. A system for operating a motor over a desired speed range by means of an alternating current source which comprises a gaseous rectifier tube and circuit, said tube having a grid-control element and means controlling the voltage impressed upon said grid-control element including a thermionic vacuum tube circuit providing a rapid decrease in grid bias potential on the grid of said rectifier tube from a potential of large magnitude to a potential of a magnitude comparable with the critical grid voltage for discharging said rectifier tube, said thermionic tube circuit including means for periodically varying in each cycle of said alternating source the output current of said thermionic tube and means for varying the rate of change of said output current in successive cycles of said alternating source in accordance with deviations of said motor's speed from a desired speed, and said rapid decrease occurring during the positive half of the alternating cycle applied to said rectifier tube.

2. A system for operating a motor over a desired adjustable speed range by means of an alternating current source which comprises a gaseous rectifier tube and circuit, said tube having a grid-control element and means controlling the voltage impressed upon said grid-control element including a thermionic vacuum tube source providing a rapid decrease in grid bias potential on the grid of said rectifier tube from a potential of large magnitude to a potential of a magnitude comparable with the critical grid voltage for discharging said rectifier tube, said vacuum tube in said source having anode, cathode and grid control electrode with means for impressing in the cathode-anode circuit a rapidly decreasing potential during the positive half of the alternating current wave impressed upon said rectifier tube and potential means applied to the grid of said vacuum tube and responsive to the combination of the back E. M. F. generated by said motor and to an oppositely applied potential source for controlling the cutoff and flow of current in said thermionic vacuum tube whereby the bias on the grid of the rectifier tube is controlled during the positive half alternating current cycle wherein said rapid decrease occurs for firing said gaseous rectifier tube at the desired point of said alternating current cycle.

3. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube heaving anode, cathode and grid control electrodes, and a resistance element common to both the cathode-anode circuit and the grid circuit of the grid of said gaseous rectifier tube, means for impressing across a portion of said cathode-anode circuit a potential rapidly decreasing during the positive half of the alternating current wave impressed upon said rectifier tube and means responsive to the combination of the back E. M. F. generated by the motor and to an oppositely applied potential source for establishing a potential on the grid of said vacuum tube for controlling the cutoff and flow of current in said anode-cathode circuit of said vacuum tube whereby the bias on the grid of the rectifier tube is controlled during the positive half of the alternating current wherein said rapid decrease occurs for firing said gaseous rectifier tube at the desired point of said alternating current cycle.

4. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube having anode, cathode and grid-control electrodes, and a resistance element common to both the cathode-anode circuit and the grid circuit of the grid of said gaseous rectifier tube, means for impressing across a portion of said cathode-anode circuit, a potential rapidly decreasing during the positive half of the alternating current wave impressed upon said rectifier tube, and means operated through the speed and load of said motor for controlling a potential source applied to the grid of said vacuum tube for governing the cathode-anode current in said vacuum tube circuit and thereby the decrease in bias on the grid of said rectifier tube for establishing the point of firing of said gaseous rectifier tube at the desired point of the alternating current cycle.

5. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube having anode, cathode and grid-control electrodes, and a resistance element common to both the cathode-anode circuit and the grid circuit of the grid of said gaseous rectifier tube, means for impressing across a portion of said cathode-anode circuit, a potential rapidly decreasing during the positive half of the alternating current wave impressed upon said rectifier tube, and means operated through the speed and load of said motor for controlling a potential source applied to the grid of said vacuum tube for governing the cathode-anode current in said vacuum tube circuit and thereby the decrease in bias on the grid of said rectifier tube for establishing the point of firing of said gaseous rectifier tube at the desired point of the alternating current cycle, said last-named means including a resistance across the armature of said motor positively applied to the grid of the vacuum tube.

6. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube having anode, cathode and grid-control electrodes, and a resistance element common to both the cathode-anode circuit and the grid circuit of the grid of said gaseous rectifier tube, means for impressing across a portion of said cathode-anode circuit, a potential rapidly decreasing during the positive half of the alternating current wave impressed upon said rectifier tube, and means operated through the speed and load of said motor for controlling a potential source applied to the grid of said vacuum tube for governing the cathode-anode current in said vacuum tube circuit and thereby the decrease in bias on the grid of said rectifier tube for establishing the point of firing of said gaseous rectifier tube at the desired point of the alternating current cycle, said last-named means including a resistance across the armature of said motor positively applied to the grid of the vacuum tube, and a constant potential source negatively applied in series with said positive source.

7. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube having anode, cathode and grid control electrodes, and a resistance element common to both the cathode-anode circuit and the grid circuit of the grid of said gaseous rectifier tube, means for impressing across a portion of said cathode-anode circuit, a potential rapidly decreasing during the positive half of the alternating current wave impressed upon said rectifier tube, and means operated through the speed and load of said motor for controlling a potential source applied to the grid of said vacuum tube for governing the cathode-anode current in said vacuum tube circuit and thereby the decrease in bias on the grid of said rectifier tube for establishing the point of firing of said gaseous rectifier tube at the desired point of the alternating current cycle, said last-named means including a resistance across the armature of said motor positively applied to the grid of the vacuum tube, and a constant potential source negatively applied in series with said positive source, both adjustable in magnitude.

8. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube having anode, cathode and grid-control electrodes, and a resistance element common to both the cathode-anode circuit and the grid circuit of the grid of said gaseous rectifier tube, means for impressing across a portion of said cathode-anode circuit, a potential rapidly decreasing during the positive half of the alternating current wave impressed upon said rectifier tube, said means comprising said alternating current source in series with a condenser and rectifier tube and a resistor in said cathode-anode circuit connected across said condenser terminals, and means operating through the speed and load of said motor for controlling a potential source applied to the grid of said vacuum tube for governing the cathode-anode current in said vacuum tube circuit and thereby the decrease in bias on the grid of said rectifier tube for establishing the point of firing of said gaseous rectifier tube at the desired point of the alternating current cycle.

9. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube having anode, cathode and grid control electrodes, and a resistance element common to both the cathode-anode circuit and the grid circuit of the grid of said gaseous rectifier tube, means for impressing across a portion of said cathode-anode circuit, a potential rapidly decreasing during the positive half of the alternating current wave impressed upon said rectifier tube, and means operated through the speed and load of said motor for controlling a potential source applied to the grid of said vacuum tube for governing the cathode-anode current in said vacuum tube circuit and thereby the decrease in bias on the grid of said rectifier tube for establishing the point of firing of said gaseous rectifier tube at the desired point of the alternating current cycle, said last-named means including a resistance across the armature of said motor positively applied to the grid of the vacuum tube, and a constant potential source negatively applied in series with said positive source, both adjustable in magnitude, the adjustment of said positive bias controlling the torque characteristics and that of the negative bias controlling the speed adjustment of said motor.

10. A system for operating a motor over a desired speed range by means of an alternating current source which comprises a gaseous rectifier tube and circuit, said tube having a grid-control element and means for controlling the voltage impressed upon said grid-control element including a thermionic vacuum tube and circuit, said vacuum tube having anode, cathode and grid-control electrodes, and a resistance element common to both the cathode-anode circuit and the grid circuit of the grid of said gaseous rectifier tube, means for impressing across a portion of said cathode-anode circuit, a potential rapidly decreasing during the positive half of the alternating current wave impressed upon said rectifier tube, and means operated through the speed and load of said motor for controlling a potential source applied to the grid of said vacuum tube for governing the cathode-anode current in said vacuum tube circuit and thereby the decrease in bias on the grid of said rectifier tube for establishing the point of firing of said gaseous rectifier tube at the desired point of the alternating current cycle, said means including means controlled at the starting of said motor for decreasing the negative value of said potential source whereby the point of firing of said gaseous rectifier tube is further retarded from its otherwise normal point of firing in the alternating current cycle.

11. An electric control circuit including, in combination, a gaseous grid-controlled rectifier having an output circuit energized by alternating potential and containing a load device, a thermionic tube having a control electrode and an output circuit, means impressing upon said control electrode a potential which is the difference between a potential adapted to represent the magnitude of a characteristic to be controlled of said load device and a potential adapted to represent a desired magnitude of said characteristic, means impressing upon the output circuit of said thermionic tube a potential decreasing at a predetermined rate during each positive half cycle of said alternating potential, and means impressing upon the grid of said rectifier a potential which is a function of the output circuit current of said thermionic tube.

12. An electric control circuit according to claim 11 including a condenser, means periodically charging and discharging the same in each cycle of said alternating potential, the decreasing potential impressed upon said thermionic tube being derived from said condenser discharge potential.

13. A system for controlling an electric motor including, in combination, a gaseous grid-controlled rectifier tube and circuit and means for controlling the voltage impressed upon said grid and thereby determining the instant of discharge of said tube in each cycle of applied alternating anode potential, said means including a thermionic tube having anode, cathode and grid electrodes, a condenser-resistance circuit, means for charging the condenser periodically in synchronism with said alternating potential, means for applying the condenser discharge voltage to the anode cathode circuit of said thermionic tube, means for applying to the grid of the latter a voltage adjustable in accordance with desired motor speed, means for opposing said applied grid voltage with a voltage varying with motor speed, a resistance, means passing the thermionic tube current through said resistance, and means for applying to the grid of said rectifier tube the voltage drop across said resistance.

14. An electric control circuit including, in combination, a gaseous grid-controlled rectifier tube having an anode-cathode output circuit adapted to be supplied with alternating potential for the energization of a load device with rectified impulses, means providing a first control potential which varies in magnitude in accordance with a characteristic to be controlled of said load device, means providing a second control potential having a polarity opposite to that of said first control potential and a magnitude adjusted in accordance with a desired magnitude of said characteristic to be controlled of said load device, a thermionic tube having anode, cathode and grid electrodes, means impressing upon said thermionic tube an anode potential which decreases at a predetermined rate during each positive half cycle of said alternating potential, means impressing a grid potential on said thermionic tube which is the resultant of said first and second control potentials and means impressing upon the grid of said rectifier a voltage which is a function of the output current of said thermionic tube.

15. A system for controlling an electric motor including, in combination, a gaseous grid-controlled rectifier tube adapted to be supplied with alternating anode potential and a thermionic vacuum tube having grid, cathode and anode electrodes and circuits therefor, means applying to the anode-cathode circuit of said thermionic tube a potential decreasing at a predetermined rate in each positive half cycle of said alternating potential and a potential varying with motor speed, means applying to the grid of said thermionic tube the algebraic sum of a negative potential adjustable in accordance with desired motor speed and a positive potential varying with motor speed, a resistor in the anode-cathode circuit of said thermionic tube and means applying the potential drop across said resistor to the grid of said rectifier tube.

WILLIAM CHRISTIAN GRABAU.